No. 766,161. PATENTED AUG. 2, 1904.
C. H. BIDWELL.
THRESHING MACHINE.
APPLICATION FILED MAY 3, 1902.
NO MODEL.

Witnesses:
Albert C. Bell.
Etha M. Smith.

Inventor
Chas. H. Bidwell.
Wm. H. Corley.

By his Atty.

No. 766,161. Patented August 2, 1904.

UNITED STATES PATENT OFFICE.

CHARLES H. BIDWELL, OF BATAVIA, NEW YORK.

THRESHING-MACHINE.

SPECIFICATION forming part of Letters Patent No. 766,161, dated August 2, 1904.

Application filed May 3, 1902. Serial No. 105,774. (No model.)

*To all whom it may concern:*

Be it known that I, CHARLES H. BIDWELL, a citizen of the United States, residing at Batavia, in the county of Genesee and State of New York, have invented an Improvement in Threshing-Machines, of which the following is a specification.

The object of my invention is to provide a feeding mechanism for a bean-thresher which shall serve to separate the bean-stalks and feed them to the cylinder in a thin sheet or layer, so as to overcome the difficulty usually experienced in bean-threshers as a result of the bunching of the bean-stalks just prior to reaching the cylinder or their tendency to string or wind around the cylinder or parts of the feeding mechanism. This object I accomplish by means of mechanism illustrated in the accompanying drawings, in which—

Figure 1:
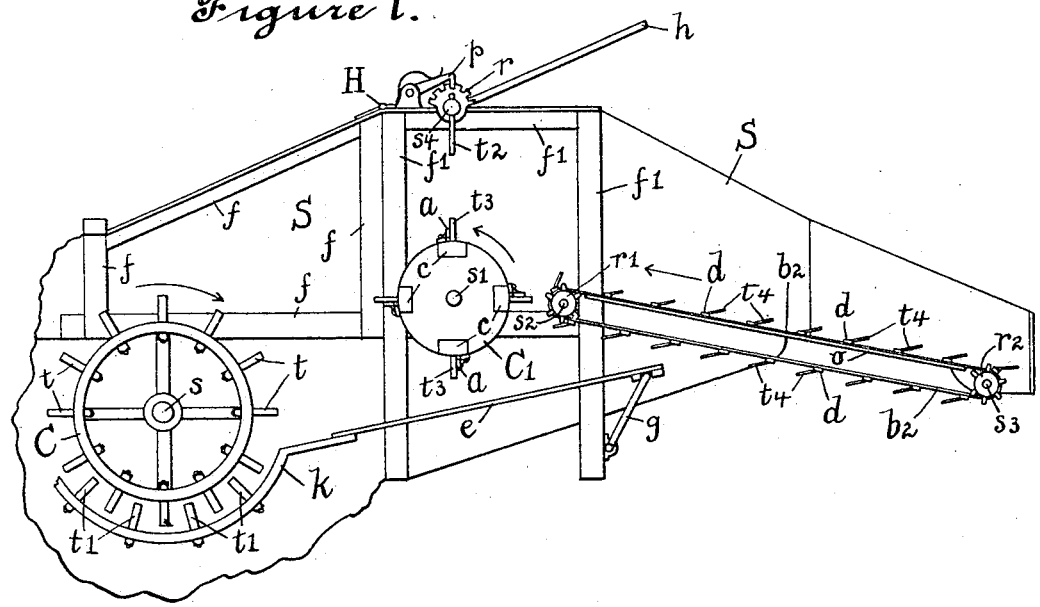
Figure 2:
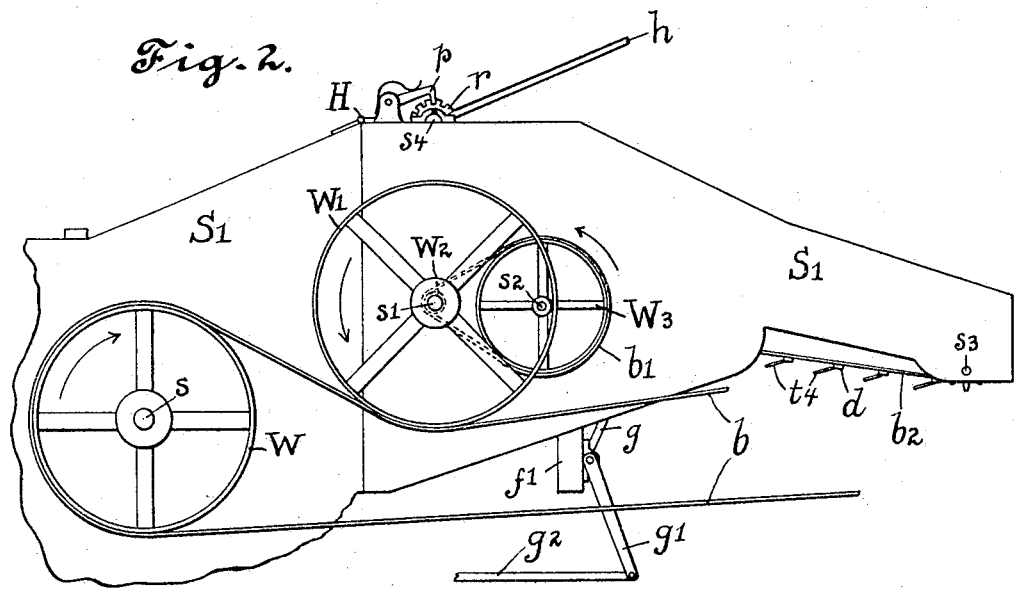
Figure 3:
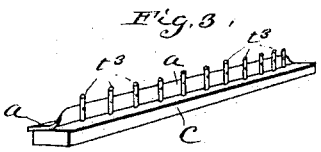

Figure 1 shows my feeding apparatus with the side of the machine toward the observer removed, while Fig. 2 shows the outside of such machine and the means for driving my feeding mechanism. Fig. 3 shows in perspective one of the cross-pieces $c$ with the plate $a$ and the teeth $t^3$ thereon.

Referring to the drawings, C represents the cylinder of a threshing-machine secured upon the shaft $s$ and driven by means of the belt $b$, working upon the pulley W, as seen in Fig. 2. Teeth $t$ are seen upon the cylinder coöperating with the teeth $t'$ upon the concave $k$ to thresh the beans from the stalks in the usual way. Pieces $f$ constitute the framework of the machine, while pieces $f'$ constitute the framework of the feeding mechanism.

In my improved bean-thresher I make use of the usual shaking-pan $e$, having its left-hand end supported upon an extension of the concave $k$ and its right-hand end articulating with the upper end of the crank $g$, secured upon a common shaft with the crank $g'$ and operated by means of the connecting-rod $g^2$ in the usual way. Above this shaking-pan $e$ I support a revolving cylinder C', secured upon the shaft $s'$, upon the end of which toward the observer and on the outside of the machine is seen the pulley W', arranged to be rotated from the driving-belt $b$ of the machine. The arrows clearly indicate the direction of rotation of the revolving parts. This cylinder C' consists of end plates supporting four cross-pieces $c$, of wood, into each of which is secured a series of teeth $t^3$, and immediately in front of each series of teeth $t^3$ is seen a thin strip of iron $a$, extending radially outward over, say, a little more than one-half of the radial length of the teeth $t^3$ and suitably secured to the cylinder C, as indicated.

Two shafts $s^2$ and $s^3$ carry rollers, around which there is caused to pass the continuous band or apron $b^2$, to which are secured the cross-pieces $d$, each carrying a series of rearwardly-extending teeth $t^4$. On the end of the shaft $s^2$ toward the observer is seen a pulley $W^3$, arranged to be driven by means of a belt $b'$, as indicated, from a small pulley $W^2$ on the shaft $s'$. The arrangement and proportions are such that six rotations, or thereabout, of the shaft $s'$ occur for every rotation of the shaft $s^2$.

Extending downward from the shaft $s^4$ are seen a series of teeth $t^2$, and secured upon this shaft $s^4$ is seen a handle $h$ and a ratchet-sector $r$, arranged to be engaged by a pawl $p$ in such a way, as clearly indicated, that any desired one of several different angles of inclination may be given to the teeth $t^2$. A bed-piece $o$ is seen just beneath the upper member of band $b^2$, and such band may be a single band, or several such bands, making in all the desired width, may be used.

S' represents the side of the machine toward the observer, (seen only in Fig. 2,) while S represents the opposite side of the machine. (Seen only in Fig. 1.)

The entire framework of the feeding mechanism, consisting in the pieces $f'$ and supporting and carrying the cylinder C' and the endless band $b^2$ and the shafts $s^2$ and $s^3$ and the rollers thereon, around which the band $b^2$ is caused to pass, as well as also the pulleys W', $W^2$, and $W^3$ and the shaking-pan $e$ and the mechanism shown for operating it, are all capable of being swung upward and over to the right, as the framework $f''$, carrying these parts, is secured to the body of the machine, as seen, by means of hinges H. In this way for purposes of transportation the entire feeding mechanism may be folded over on the top of the machine.

The operation is as follows: The bean-stalks are fed in the usual way by means of forks upon the traveling band $b^2$. By this band $b^2$ and the strips $d$ and teeth $t^4$ the bean-stalks are carried to the left and arranged to be engaged by the teeth $t^3$, projecting radially outward from the cylinder $C'$. The rapid rotation of this cylinder $C'$ operates to draw the fodder away from the band $b^2$ and carry it over to the left; but the teeth $t^4$ tend to hold the bean-stalks back and prevent their moving to the left faster than the rate of travel of the band $b^2$. By this means the bean-stalks are thoroughly separated, so that they cannot be fed over to the left to the cylinder C in bunches, but are caused to be strung out in a thin sheet. If for any reason a bunch of bean-stalks lying loosely upon the traveling band $b^2$ should be drawn therefrom, it would be forced against the teeth $t^2$ on the shaft $s^4$ in such a way as to be finely divided by its engagement with such teeth $t^2$ and the revolving teeth $t^3$, the space between the teeth $t^2$ and $t^3$ being such that no bundle or wad of the stalks can be drawn through without being separated. Sometimes in wet or green stalks there is a tendency to string or wind around the cylinder C and also around the feeding-cylinder $C'$. This is almost entirely overcome by the use of the strips $a$, the edges of which striking against the under side of the sheet of bean-stalks as it is being drawn by the teeth $t^3$ from the feeding-band $b^2$ tend to lift them in the middle and break them in such a way as to prevent any stringing or winding action which would occur were the strips $a$ omitted and the bean-stalks allowed to feed directly upon the surface of the cylinder $C'$. The action of these iron strips $a$ is twofold. The layer or sheet of stalks is drawn taut by the teeth $t^3$ on one strip $c$ of the cylinder $C'$ as it revolves over to the left, while the strip $a$ in front of the next row of teeth $t^3$ to the rear serves to increase the strain upon the stalks as they are drawn forward, and at the same time by means of the rapid rotation of the cylinder $C'$ the edges of the strips $a$, striking against the under side of the bean-stalks, tend to break the bean-stalks, and thus prevent their stringing or winding around the cylinders.

What I claim is—

1. In a threshing-machine, in combination with a traveling band for feeding the straw or stalks to the threshing-cylinder thereof, a series of rearwardly-extending teeth on such traveling band, a revolving cylinder between such band and the threshing-cylinder of the machine carrying a series of teeth, and means for supporting and revolving such traveling band and for supporting and revolving such cylinder at a rate of rotation such that the travel and the direction thereof of the teeth on such cylinder shall tend to separate the stalks or straw into a thin layer before delivering the same to the threshing-cylinder of the machine, such revolving cylinder carrying also metal strips arranged to strike the sheet of stalks from the under side and at the same time increase the tension on and break the fibers thereof.

2. In a threshing-machine, in combination with a traveling band for feeding the straw or stalks to the threshing-cylinder thereof, a series of rearwardly-extending teeth on such traveling band, a revolving cylinder between such band and the threshing-cylinder of the machine carrying a series of teeth, and means for supporting and revolving such traveling band and for supporting and revolving such cylinder at a rate of rotation such that the travel and the direction thereof of the teeth on such cylinder shall tend to separate the stalks or straw into a thin layer before delivering the same to the threshing-cylinder of the machine, and a series of teeth supported above such cylinder and arranged to engage any bundle or wad of straw or stalks and prevent the same from being carried over by such teeth on such cylinder.

3. In a threshing-machine, in combination with a traveling band for feeding the straw or stalks to the threshing-cylinder thereof, a series of rearwardly-extending teeth on such traveling band, a revolving cylinder between such band and the threshing-cylinder of the machine carrying a series of teeth, and means for supporting and revolving such traveling band and for supporting and revolving such cylinder at a rate of rotation such that the travel and the direction thereof of the teeth on such cylinder shall tend to separate the stalks or straw into a thin layer before delivering the same to the threshing-cylinder of the machine, and a series of teeth supported above such cylinder and arranged to engage any bundle or wad of straw or stalks and prevent the same from being carried over by such teeth on such cylinder, such series of teeth being adjustably supported above the cylinder so that their angle of inclination relative thereto may be varied as desired.

4. In a threshing-machine, in combination with the threshing-cylinder thereof, a traveling feeding-band having teeth thereon, and between such band and such threshing-cylinder a revolving feeding-cylinder also carrying a series of teeth, means for supporting and revolving such feeding-band and feeding-cylinder whereby the teeth on such feeding-cylinder travel with greater speed than the teeth on such feeding-band and thereby cooperate with the teeth on such band to draw apart the straw or stalks fed to the machine, in the direction of the travel thereof to such threshing-cylinder, and means for preventing the stalks or straw winding around such feeding-cylinder comprising means for severing such stalks transversely of the direction of their travel, and as they are fed, to such revolving feeding-cylinder.

5. In a threshing-machine, in combination with the threshing-cylinder thereof, a traveling feeding-band having rearwardly-extending teeth thereon, and between such band and such threshing-cylinder a revolving feeding-cylinder also carrying a series of teeth, means for supporting and revolving such feeding-band and feeding-cylinder whereby the teeth on such feeding-cylinder travel with greater speed than the teeth on such feeding-band, and thereby coöperate with the teeth on such band to draw apart the straw or stalks fed to the machine, in the direction of the travel thereof to such threshing-cylinder, and means for preventing the stalks or straw winding around such feeding-cylinder comprising means for severing such stalks transversely of the direction of their travel, and as they are fed to, such revolving feeding-cylinder.

6. In a threshing-machine, in combination with the threshing-cylinder thereof and a revolving feeding-cylinder, having a series of teeth thereon and arranged to deliver the straw or stalks to such threshing-cylinder, means for advancing the straw or stalks so as to be engaged by the teeth on such revolving feeding-cylinder and for holding back such straw or stalks, except as engaged by such teeth on such revolving feeding-cylinder, and means for preventing the straw or stalks winding around such feeding-cylinder comprising means for severing such stalks or straw transversely of the direction of their travel, and as they are fed, to such revolving feeding-cylinders.

C. H. BIDWELL.

Witnesses:
   HAWLEY N. BIDWELL,
   HERBERT T. BOOTH.